(12) United States Patent
Zhou et al.

(10) Patent No.: US 12,262,413 B2
(45) Date of Patent: Mar. 25, 2025

(54) DATA RECEIVING METHOD AND APPARATUS, STORAGE MEDIUM AND TERMINAL

(71) Applicant: SPREADTRUM COMMUNICATIONS (SHANGHAI) CO., LTD., Shanghai (CN)

(72) Inventors: Huayu Zhou, Shanghai (CN); Xingya Shen, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 347 days.

(21) Appl. No.: 17/775,455

(22) PCT Filed: Sep. 9, 2020

(86) PCT No.: PCT/CN2020/114151
§ 371 (c)(1),
(2) Date: May 9, 2022

(87) PCT Pub. No.: WO2021/088506
PCT Pub. Date: May 14, 2021

(65) Prior Publication Data
US 2022/0400516 A1    Dec. 15, 2022

(30) Foreign Application Priority Data
Nov. 8, 2019   (CN) .......................... 201911097502.X

(51) Int. Cl.
*H04W 74/0808* (2024.01)

(52) U.S. Cl.
CPC .............................. *H04W 74/0808* (2013.01)

(58) Field of Classification Search
CPC .................................................. H04W 74/0808
See application file for complete search history.

(56) References Cited

U.S. PATENT DOCUMENTS

2015/0110012 A1*  4/2015  Bhushan ........... H04W 74/0816
                                                             370/329
2015/0201429 A1*  7/2015  Chen ..................... H04W 72/54
                                                             370/329

(Continued)

FOREIGN PATENT DOCUMENTS

CN      106162658 A     11/2016
CN      106301733 A     1/2017

(Continued)

OTHER PUBLICATIONS

International Search Report for International Application No. PCT/CN2020/114151; Mailing date of Dec. 8, 2020.

(Continued)

*Primary Examiner* — Ajay Cattungal
(74) *Attorney, Agent, or Firm* — CANTOR COLBURN LLP

(57) ABSTRACT

A method and apparatus for receiving data, a storage medium and a terminal are provided. The method includes: detecting a downlink signal in a Fixed Frame Period (FFP); and determining that an uplink transmission or a downlink reception can be performed in the FFP in response to the downlink signal being detected in the FFP.

20 Claims, 1 Drawing Sheet

```
the UE detects a downlink signal in a FFP          — S101 the UE determines that an uplink transmission or a downlink
reception can be performed in the FFP in response to the downlink   — S102
signal being detected in the FFP
```

(56) References Cited

U.S. PATENT DOCUMENTS

| | | | |
|---|---|---|---|
| 2016/0338006 A1* | 11/2016 | Lee | H04W 52/0229 |
| 2017/0318607 A1* | 11/2017 | Tiirola | H04W 4/10 |
| 2017/0347382 A1* | 11/2017 | Ji | H04W 72/0453 |
| 2018/0109968 A1* | 4/2018 | Luo | H04L 5/001 |
| 2018/0132271 A1 | 5/2018 | Jung et al. | |
| 2018/0192442 A1 | 7/2018 | Li et al. | |
| 2018/0220451 A1* | 8/2018 | Bhushan | H04W 74/08 |
| 2018/0249497 A1 | 8/2018 | Noh et al. | |
| 2019/0200379 A1 | 6/2019 | Wang et al. | |
| 2019/0297577 A1 | 9/2019 | Lin et al. | |
| 2019/0306827 A1 | 10/2019 | Agiwal et al. | |
| 2020/0280994 A1 | 9/2020 | Liu et al. | |
| 2020/0396767 A1* | 12/2020 | Talarico | H04W 74/0808 |
| 2021/0127419 A1 | 4/2021 | Zhang | |
| 2022/0159723 A1* | 5/2022 | Jiang | H04W 74/0866 |
| 2022/0377683 A1* | 11/2022 | Myung | H04W 74/0816 |

FOREIGN PATENT DOCUMENTS

| | | |
|---|---|---|
| CN | 106851822 A | 6/2017 |
| CN | 107466110 A | 12/2017 |
| CN | 107637006 A | 1/2018 |
| CN | 108352958 A | 7/2018 |
| CN | 109302746 A | 2/2019 |
| CN | 110351881 A | 10/2019 |
| CN | 110856180 A | 2/2020 |
| WO | 2018141308 A1 | 8/2018 |

OTHER PUBLICATIONS

Ad-Hoc Chair (Ericsson) "Charman's notes of Al 7.2.2 NR-based Access to Unlicenced Spectrum"; 3GPP TSG-RAN WG1 Meeting #98bis; Tdoc R1-1911511; Chongqing, CN; Oct. 14-20, 2019; 13 pages.

Intel Corporation "Signaling Support for Frame Based Equipment for NR-u"; 3GPP TSG-RAN WG2 108; R2-1914579; Chongqing, CN; Oct. 14-20, 2019; 4 pages.

MCC Support Draft Report of 3GPP TSG RAN WG1#98bis v0.1.0; Chongqing, CN Oct. 14-20, 2019; 3GPP TSG RAN WG1 Meeting #99; R1-191xxxx; Reno, USA; Nov. 18-22, 2019; 19 pages.

ZTE, Sanechips Considerations on DL reference signals and channels for NR-U; 3GPP TSG RAN WG1Meeting#98bis; R1-1909972; Chongqing, CN; Oct. 14-20, 2019; 8 pages.

SIPA First Office Opinion Notice for corresponding CN Application No. 202210227189.2; Issued Mar. 19, 2024.

SIPA First Office Action for corresponding CN Application No. 201911097502.X; issued Jun. 11, 2021.

* cited by examiner

DATA RECEIVING METHOD AND APPARATUS, STORAGE MEDIUM AND TERMINAL

CROSS-REFERENCE TO RELATED APPLICATIONS

This is the U.S. national stage of application No. PCT/CN2020/114151, filed on Sep. 9, 2020. Priority under 35 U.S.C. § 119(a) and 35 U.S.C. § 365(b) is claimed from Chinese Application No. 201911097502.X, filed Nov. 8, 2019, and entitled "DATA RECEIVING METHOD AND APPARATUS, STORAGE MEDIUM AND TERMINAL", the disclosure of which is also incorporated herein by reference.

TECHNICAL FIELD

The present disclosure generally relates to wireless communication technology field, and more particularly, to a method and apparatus for receiving data, a storage medium, and a terminal.

BACKGROUND

The 3rd Generation Partnership Project (3GPP) standard organization is working on The Fifth-Generation mobile communications (5G) New Radio (NR) system.

In the unlicensed spectrum, a base station (such as a gNB) and/or a User Equipment (UE) may perform a Listen-Before-Talk (LBT) or a Channel Access Assessment (CAA) or a Sensing channel to evaluate whether a channel is idle or busy. When an evaluation result satisfies a certain condition, the base station and/or the UE may obtain a Channel Occupancy (CO) or a channel access in a Channel Occupancy Time (COT).

Generally, a base station may transmit information related to a CO through a Group Common PDCCH (GC-PDCCH). That is, when the base station obtains the CO, the base station may notify a UE through the GC-PDCCH that the base station has obtained the CO, and the UE may perform an uplink transmission or a downlink reception in the COT.

However, the UE may not detect the GC-PDCCH successfully due to a poor channel quality. There is a need for a method for receiving data in the unlicensed frequency, so as to improve the probability of the uplink transmission or the downlink reception of the UE.

SUMMARY

Embodiments of the present disclosure provide a method and apparatus for receiving data, a storage medium, and a terminal, which can improve the CO probability of a UE in a unlicensed frequency band.

In an embodiment of the present disclosure, a method for receiving data is provided, including: detecting a downlink signal in a Fixed Frame Period (FFP); and determining that an uplink transmission or a downlink reception can be performed in the FFP in response to the downlink signal being detected in the FFP.

In an embodiment of the present disclosure, an apparatus for receiving data is provided, including: a detecting circuitry, adapted to detect a downlink signal in a Fixed frame period (FFP); and a determining circuitry, adapted to determine that an uplink transmission or a downlink reception can be performed in the FFP in response to the downlink signal being successfully detected in the FFP.

In an embodiment of the present disclosure, a non-transitory storage medium is provided, the non-transitory storage medium storing one or more programs, the one or more programs comprising computer instructions, which, when executed by a processor, cause the processor to: detect a downlink signal in a Fixed Frame Period (FFP); and determine that an uplink transmission or a downlink reception can be performed in the FFP in response to the downlink signal being detected in the FFP.

DETAILED DESCRIPTION

Figure 1:
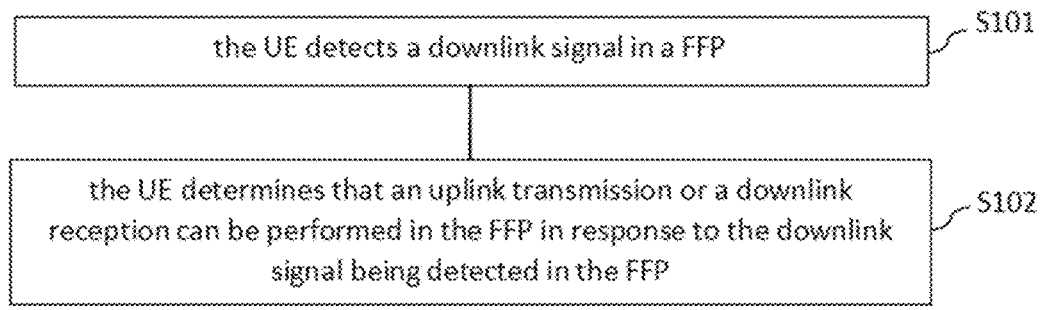
FIG. 1 schematically illustrates a flowchart of a method for receiving data according to an embodiment of the present disclosure.

As mentioned in background, there is a need for a method to solve the problem of how the UE determines the Channel Occupancy (CO).

In the Release 15 (Rel-15) NR system, synchronization signals and broadcast channels are transmitted in SS/PBCH blocks (SSB). Further, the 5G system also introduces functions such as beam sweeping. Wherein, an SSB may include a Primary Synchronization Signal (PSS), a Secondary Synchronization Signal (SSS) and a Physical Broadcast Channel (PBCH).

Each SSB corresponds to a predetermined time domain position. The time domain position may also be referred to as a candidate SSB. An SSB can be seen as a beam (analogue domain) resource during a beam sweeping. A plurality of SSBs may form a SS-burst. ASS-burst can be regarded as a relatively concentrated resource containing a plurality of beams. And a plurality of SS-burst may constitute a synchronization signal burst set. The SSBs are transmitted on different beams repeatedly to complete the beam scanning process. Through the training of the beam scanning, a UE can determine which beam receives a strongest signal.

Further, a Remaining Minimum System Information (RMSI, or, System Information Block 1, SIB1 for short) in the Rel-15 NR is equivalent to a SIB1 in the LTE, which includes main system information except a Master Information Block (MIB). The RMSI may also be referred to as a SIB1. The RMSI is carried by a Physical Downlink Shared Channel (PDSCH), and the PDSCH is scheduled through a Physical Downlink Control Channel (PDCCH). A PDSCH for carrying a RMSI is generally referred to as a RMSI PDSCH, and a PDCCH for scheduling a RMSI PDSCH is generally referred to as a RMSI PDCCH.

A search space set where a RMSI PDCCH (may also be called a SIB1 PDCCH or a Type0-PDCCH) is located generally be called a Type0-PDCCH search space set or a Type0-PDCCH common search space set and is generally configured by a MIB or is configured by a Radio Resource Control (RRC) in switching situation and the like.

In general, an Identity (ID) corresponding to a Type0-PDCCH search space set is 0, therefore, the Type0-PDCCH search space set is called a search space 0 (or a search space set 0), and a CORESET associated with the search space 0 is called a CORESET 0. In addition to the search space set of the RMSI PDCCH, other common search spaces or common search spaces sets can be determined as the same as the search space set 0 by default, such as a search space set of Other System Information (OSI) PDCCH (Type0A-PDCCH search space set), a search space set of a Random Access Response (RAR) PDCCH (Type1-PDCCH search space set), a search space set of a paging PDCCH (Type2-PDCCH search space set), and so on. In general, the above-mentioned common search spaces or common search spaces sets can be reconfigured.

A RMSI PDCCH monitoring occasion is associated with a SSB. A UE may obtain the association based on a monitoring occasion table of the RMSI PDCCH. During an initial access process, when the UE finds a certain SSB, the UE may determine a time domain position of a RMSI PDCCH associated with the SSB (a starting symbol index or a first symbol index) based on a row index of the table indicated by a PBCH, detect the RMSI PDCCH, and receive and decode the RMSI PDSCH based on the RMSI PDCCH scheduling.

In the Rel-15 NR, a UE may decode a RMSI PDCCH to obtain a plurality of bits allocated by a time domain resource and look up in a predefined table based on the bits to obtain a starting symbol index (or a starting symbol number) and a symbol length (or a duration) of the RMSI PDSCH.

In general, a search space set may include properties such as a monitoring occasion and a search space type of the PDCCH. The search space set is generally associated with a Control Resource Set (CORESET), and the CORESET may include properties such as a frequency domain resource and a duration of the PDCCH.

In the Rel-15 NR, for a given UE, a Paging Occasion (PO) corresponding to the UE consists of a plurality of paging PDCCH monitoring occasions. In a PO, a paging PDCCH may be transmitted by the beam sweeping like a SSB. In a PO, the paging PDCCH monitoring occasions correspond to the SSBs one by one. That is, in one PO, a K-th paging PDCCH monitoring occasion corresponds to a K-th SSB.

In the Rel-15 NR, generally, a UE may support a bandwidth of 100 MHz. During an initial access process, the UE may detect the PSS/SSS/PBCH in the SSB blindly and obtain the MIB and time index information carried in the PBCH. The UE may obtain a configuration of a CORESET (may be called CORESET0) and a search space set (may be called search space set 0) to which the PDCCH for scheduling a SIB1 (or RMSI) belongs through the information in the MIB, and further, the UE may monitor and schedule the Type0-PDCCH of the PDSCH for carrying the SIB1 and decode the SIB1. Since the bandwidth of the CORESET0 is set through a table in the PBCH, the maximum bandwidth of CORESET0 is implicitly defined in a protocol. Further, the protocol stipulates that a frequency domain resource of the PDSCH for carrying the SIB1 is within the bandwidth of CORESET0 (PRB), therefore, the maximum bandwidth of the PDSCH for carrying the SIB1 is also implicitly defined in the protocol.

On the NR unlicensed spectrum, a SSB needs to be defined so that a UE can detect a NR unlicensed spectrum cell in a cell search. On the NR unlicensed spectrum, a base station needs to perform a LBT before transmitting a Discovery Reference Signal (DRS) or an SSB. The base station only transmits the DRS or the SSB after monitoring that the channel is idle. Otherwise, after a certain period of time, the base station performs the LBT again. The DRS or the SSB is transmitted in a certain transmission window. The transmission window can be agreed upon by the base station and the UE, or the transmission window can be configured by an RRC signaling through a Discovery reference signal Measurement Timing Configuration (DMTC) or a Synchronization Measurement Timing Configuration (SMTC). A DRS or an SSB has a number of predefined time domain positions.

On the NR unlicensed spectrum, before transmitting an RMSI, the base station may also need to perform a LBT, only after monitoring that the channel is idle, the base station transmits the RMSI. Otherwise, the base station performs the LBT again after a certain period of time. The RMSI is transmitted in a certain transmission window. The transmission window can be agreed upon by the base station and the UE, or the transmission window can be configured by an MIB or an RRC signaling. Since the LBT needs to be performed, the RMSI needs to be shifted back for a certain time. For supporting the backward-shifting property of the RMSI on the unlicensed spectrum, the RMSI needs to have a plurality of predefined time domain positions.

On the NR unlicensed spectrum, a base station may obtain a Transmission Opportunity (TXOP) through a LBT, and may transmit an initial signal to inform a UE that the base station has obtained the TXOP. After successfully detecting the initial signal and knowing that the base station has obtained the TXOP, the UE starts a series of actions, for example, monitor a PDCCH, etc. The initial signal may also be called a Preamble, or a Wake-Up Signal (WUS). The UE detects the initial signal by default in an active time and starts monitoring the PDCCH only when the initial signal is detected. In this way, the initial signal is used to save power. Therefore, the initial signal may also be called a Power Saving Signal.

Generally, after successfully detecting the initial signal, the UE needs to monitor one or more types of PDCCHs to obtain a Channel Occupancy Time (COT). The one or more type of PDCCHs may be configured through a search space set. The COT may include a duration of a channel occupied by the base station (such as several milliseconds, or several time slots, etc.), formats of the time slots in the duration (such as configurations of uplink, downlink, and flexible symbol), and an available LBT sub-band in the duration (the basic unit of LTB, such as 20 MHz bandwidth), etc. The LBT sub-band may also be referred to as a channel, or a sub-channel, or a LBT sub-band, or a LBT bandwidth, or a RB set.

In the unlicensed spectrum, a base station may perform a LBT or a CAA to obtain a Channel Occupancy (CO). After obtaining the CO, the base station may transmit a downlink signal. In different use cases, the downlink signals that a UE can detect may be different. If the UE detects a downlink signal in a Fixed Frame Period (FFP), it is not yet provided in the existing technology on how to effectively utilize the detected downlink signal.

In the embodiment of the present disclosure, a method for receiving data is provided, including: detecting a downlink signal in a FFP; and determining that an uplink transmission or a downlink reception can be performed in the FFP in response to the downlink signal being detected in the FFP.

According to embodiment of the present disclosure, after detecting the downlink signal successfully, the UE can perform the uplink transmission or the downlink reception in the FFP where the downlink signal is located. Therefore, a feasible solution is provided for the UE to quickly occupy the unlicensed frequency band, which is beneficial for improving the successful probability of a terminal obtaining the channel occupancy of the unlicensed frequency band.

In order to clarify the object, characteristic and advantages of embodiments of the present disclosure, the embodiments of present disclosure will be described clearly in detail in conjunction with accompanying drawings.

Embodiments of the present disclosure are applicable to 5G, 4G and 3G communication systems, and various communication systems evolved subsequently.

The embodiments of the present disclosure are also applicable to different network architectures, including but not limited to relay network architecture, dual link network architecture, and Vehicle-to-Everything communication architecture.

The base station in the embodiments of the present disclosure may also be referred to as a base station equipment, and is a device deployed in a wireless access network to provide wireless communication functions. For example, an equipment that provides a base station function in a 2G network includes a Base Transceiver Station (BTS) and a Base Station Controller (BSC). An equipment that provides the base station function in a 3G network includes a Node B and a Radio Network Controller (RNC). An equipment that provides the base station function in a 4G network includes an evolved Node B (eNB). In a Wireless Local Area Network (WLAN), an equipment that provides the base station function is an Access Point (AP). An equipment that provides the base station function in a 5G New Radio (NR) includes a continuously evolved Node B (gNB). And the base station also refers to an equipment that provides the base station function in a new communication system in the future.

A terminal in the embodiments of the present disclosure (such as a sending terminal and/or a receiving terminal) may refer to various forms of UE, access terminal, user unit, user station, Mobile Station (MS), remote station, remote terminal, mobile equipment, user terminal, terminal equipment, wireless communication equipment, user agent or user device. The terminal equipment may further be a cellular phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modems, an in-vehicle device, a wearable device, a terminal equipment in the future 5G network, or a terminal equipment in a future evolved Public Land Mobile Network (PLMN), which is not limited in the embodiments of the present disclosure.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The "connection" in the embodiments of the present disclosure refers to various connection ways such as direct connection or indirect connection to realize communication between devices, which is not limited in the embodiments of the present disclosure.

FIG. 1 schematically illustrates a flowchart of a method for receiving data according to an embodiment of the present disclosure. The method may be performed by a UE, for example, by a NR UE. The method may include S101 and S102.

In S101, the UE detects a downlink signal in a FFP.

In S102, the UE determines that an uplink transmission or a downlink reception can be performed in the FFP in response to the downlink signal being detected in the FFP.

For a Frame based Equipment (FBE) operation, generally, a base station performs a LBT in a certain period of time at the end of the FFP to obtain a CO in the FFP. When the UE does not detect a Group Common PDCCH (GC-PDCCH), the UE may still obtain the occupancy situation of the CO by detecting a downlink signal (including a downlink channel) in the FFP.

When the UE and the base station on the network side perform data transmission and reception in the unlicensed frequency band, in order to save the power consumption of the UE, the LBT can be performed by the base station.

When the base station performs the LBT in a certain period of time at the end of the FFP, and obtains the CO, the base station may transmit information about the CO to the UE.

In S101, the UE may detect the downlink signal in the FFP. In a specific implementation, the UE may detect the downlink signal in the FFP of the unlicensed frequency band. If the UE detects the GC-PDCCH successfully at a beginning of the FFP, the UE can obtain the information about the channel occupied by the base station from the downlink control information.

In an embodiment, the downlink signal includes a downlink control signal. In another embodiment of the present disclosure, the downlink signal at least includes one selected from a group consisting of: a Physical Downlink Control Channel (PDCCH) signal, a SS/PBCH block (SSB), a Physical Broadcast Channel (PBCH) signal.

In S102, the UE determines that the uplink transmission or the downlink reception can be performed in the FFP if the UE detects the downlink signal in the FFP successfully. The UE determines that the uplink transmission or the downlink reception can be performed in the FFP, which is equivalent to that the UE confirms that the base station obtains the CO and shares the CO with the UE.

In an embodiment, if the GC-PDCCH is not detected in the FFP, but some downlink signals other than the GC-PDCCH is detected, the UE may determine that the uplink transmission or the downlink reception can be performed in the FFP. The UE determines that the uplink transmission or the downlink reception can be performed in the FFP, which is equivalent to that the UE confirms that the base station obtains the CO and shares the CO with the UE.

Wherein, the uplink transmission may at least include one selected from a group consisting of: a Physical Uplink Control Channel (PUCCH) transmission, a Configured Grant Physical Uplink Shared Channel (CG-PUSCH) transmission, a periodic Sounding Reference Signal (SRS) transmission, a Semi-Persistent SRS transmission, a Physical Random Access Channel (PRACH) transmission, and an autonomous uplink transmission. The uplink transmission is not limited to the above-mentioned situation and may include other configured or periodic uplink transmissions.

The downlink reception may at least include one selected from a group consisting of: a Channel State Information Reference Signal (CSI-RS) reception, and a Semi-Persistent Scheduling Physical Downlink Shared Channel (SPS-PDSCH). The downlink reception is not limited to the above-mentioned situation and may include other configured or periodic downlink receptions.

In some embodiment, the UE uses a channel with a high priority to conduct a channel sensing, a channel assessment a LBT; or the UE uses a channel with a highest priority to conduct a channel sensing, a channel assessment or a LBT, which is beneficial for improving the successful probability of the uplink transmission.

In some embodiment, the UE determining an uplink transmission can be performed in the FFP includes the UE performs the uplink transmission when a channel is sensed to be idle in a first duration or performs the uplink transmission without sensing the channel. Wherein, the first duration refers to a duration with a relatively small parameter value among a plurality of durations. For example, the parameter value is 9 microseconds, 16 microseconds, or 25 microseconds. The first duration may be 9 microseconds or 16 microseconds.

In some embodiment, the UE may select a smaller sensing channel duration for a channel sensing or a channel assessment or a LBT before an uplink transmission, which is beneficial for improving the successful probability of the uplink transmission.

In some embodiment, if a time gap between an uplink transmission Burst and a downlink transmission Burst (of a base station) is less than or equal to T1 microseconds, the UE may perform the uplink transmission without sensing the channel. In general, T1 may be 16.

In some embodiment, if a time gap between an uplink transmission Burst and a downlink transmission Burst (of a base station) is greater than T1 microseconds, and the UE detects that the channel is idle within the duration of T2 microseconds, the UE may perform the uplink transmission without sensing the channel. In general, T1 may be 16, and T2 may be 9.

In some embodiment, assuming that the downlink signal is a PDCCH, in this case, a bandwidth of the downlink reception is located in a LBT bandwidth or a LBT sub-band where the PDCCH is located; or the bandwidth of the downlink reception is located in a LBT bandwidth or a LBT sub-band of a Control Resource Set (CORESET) to which the PDCCH belongs.

In some embodiment, the downlink signal is a PDCCH, a Cyclic Redundancy Check (CRC) of the PDCCH may use a Cell-Radio Network Temporary Identity (C-RNTI), a System Information RNTI (SI-RNTI), a paging RNTI (P-RNTI), a Random Access RNTI (RA-RNTI) or a Temporary C-RNTI (TC-RNTI) scrambling. It should be noted that the PDCCH being successfully detected refers to passing the CRC of the PDCCH.

In some embodiment, the PDCCH may be a PDCCH carrying a Paging Indicator. The Paging Indicator is used to trigger a group or one paging PDCCHs that the UE monitors on a current PO or a subsequent PO. The subsequent PO may be understood as a nearest PO after the current moment. The subsequent PO may also be understood as any one PO after the current moment.

In some embodiment, the downlink signal is a paging PDCCH or an OSI PDCCH, and a number of paging PDCCH monitoring occasions or a number of OSI PDCCH monitoring occasions is S. Wherein, S represents a number of actually transmitted SSBs indicated by a base station, or S represents a number of SSBs in a subset of an actually transmitted SSB set indicated by the base station, and S is an integer. The subset of the actually sent SSB set is a set formed of SSBs which are non-Quasi Co-Located (non-QCLed).

Those skilled in the art understand that SSBs have a Quasi Co-Located (QCL) relationship within a transmission window or between transmission windows, and the SSBs which are non-QCLed form a subset.

In some embodiment, there is a time gap exists between a starting time of the uplink transmission and a starting time of the FFP; or a time gap exists between a starting time of the downlink reception and the starting time of the FFP. Wherein, the time gap is predefined or configured by a base station.

In some embodiment, there is a time gap exists between a starting time of the uplink transmission and a first GC-PDCCH; or a time gap exists between a starting time of the downlink reception and the first GC-PDCCH. Wherein, the first GC-PDCCH refers to a GC-PDCCH closest to the starting time. Wherein, the time gap is predefined or configured by a base station.

In an embodiment, the downlink signal includes an SSB, wherein a bandwidth of the downlink reception is located in a LBT bandwidth or a LBT sub-band where the SSB is located; or the bandwidth of the downlink reception is located in a LBT bandwidth or a LBT sub-band of a Bandwidth Part (BWP) to which the SSB belongs. The BWP to which the SSB belongs may refer to an initial active DL BWP or a BWP with a BWP identity (ID) of 0 (BWP 0). In some embodiment, the SSB being successfully detected refers to that a UE determines that the SSB is transmitted by a base station.

In an embodiment, the downlink signal includes a PBCH, wherein a bandwidth of the downlink reception is located in a LBT bandwidth or a LBT sub-band where the PBCH is located; or the bandwidth of the downlink reception is located in a LBT bandwidth or a LBT sub-band of a BWP to which the PBCH belongs. The BWP to which the SSB belongs may refer to an initial active DL BWP or a BWP with a BWP identity (ID) of 0 (BWP 0). In some embodiment, the PBCH being successfully detected refers to passing a CRC of the PBCH.

In some embodiment, the downlink signal includes an SSB or a PBCH, a number of monitoring occasions of the SSB or the PBCH is S; wherein, S represents a number of actually transmitted SSBs indicated by a base station, or, S represents a number of SSBs in a subset of an actually transmitted SSB set indicated by the base station, and S is an integer. The subset of the actually transmitted SSB set is a set formed of SSBs which are non-Quasi Co-Located (non-QCLed).

Further, if the PBCH is detected successfully, the UE may determine a SSB where the PBCH is located as a measurement sample for a Radio Resource Management (RRM) measurement and/or a Radio Link Monitoring (RLM) measurement. In other words, the UE may obtain channel quality information by decoding the PBCH or the SSB, and then may determine the SSB where the PBCH is located as a measurement result. When the PBCH is detected successfully, the UE may determine the SSB where the PBCH is located as a synchronization sample for the measurement to indicate an In-sync.

In an embodiment, assuming that a base station may transmit an idle state (IDLE) GC-PDCCH, if the idle state GC-PDCCH is detected in the FFP, an idle state UE may determine that an uplink transmission or a downlink reception can be performed in the FFP.

In some embodiment, configuration information of the idle state GC-PDCCH may be carried by a SIB1. A CORESET associated with the idle state GC-PDCCH may be a CORESET0 by default. And the idle state GC-PDCCH may carry a Paging Indicator.

In some embodiment, when a FFP corresponding to the idle state GC-PDCCH includes a PO or a paging PDCCH monitoring occasion or signals/channels related to a process of transmitting/receiving an RACH (including signals/channels related to Msg-1, Msg-2, Msg-3, Msg-4). In general, a channel associated with the Msg-1 may be a PRACH. A channel associated with the Msg-2 may be a Random Access Response PDCCH and/or an RAR PDSCH. A channel associated with the Msg-3 may be a PUSCH and/or a PUCCH. A channel associated with the Msg-4 may be a PDCCH and/or PDSCH.

The following describes in detail with specific embodiments, in order to determine whether an uplink transmission or a downlink reception can be performed by detecting a downlink signal.

In some embodiment, the uplink transmission may at least include transmitting a PUCCH, a CG-PUSCH, a periodic SRS, a Semi-Persistent SRS transmission, a PRACH, or an autonomous uplink transmission. The downlink reception may at least include receiving a CSI-RS or a SPS-PDSCH.

In some embodiment, in general, a base station may configure a GC-PDCCH for a UE at a beginning of an FFP when the UE is in a connected state (CONNECTED). Once the UE detects the GC-PDCCH at the beginning of the FFP, the UE can obtain the information about the channel occupied by the base station from the downlink control information. If the UE does not detect the GC-PDCCH or the base station does not configure the GC-PDCCH, when the UE detects downlink signals other than the GC-PDCCH, subsequent processing can be performed according to following embodiments (Embodiment one or Embodiment two).

Embodiment one: if a PDCCH is detected in a FFP, a UE may determine that an uplink transmission or a downlink reception can be performed in the FFP. In general, the UE is configured with a PDCCH which needs to be monitored periodically. Even if a GC-PDCCH is not detected by the UE or the GC-PDCCH is not configured, the UE can still obtain information about a channel occupied by the base station in the current FFP through the detected PDCCH.

That the uplink transmission may be performed may refer to that the UE uses a channel with a high priority to conduct a channel sensing, a channel assessment or a LBT. That the uplink transmission may be performed may also refer to that the UE uses a channel with a highest priority to conduct a channel sensing, a channel assessment or a LBT, which is beneficial for improving the successful probability of the uplink transmission.

That the uplink transmission may be performed may refer to that the UE selects a smaller sensing channel duration for a channel sensing or a channel assessment or a LBT. For example, the sensing channel duration may be 16 µs, 25 µs, etc. The sensing channel duration may also be referred to as a Short Inter-Frame Space (SIFS). That the uplink transmission may be performed may also refer to that the UE does not perform a channel sensing or a channel assessment or a LBT, which is beneficial for improving the successful probability of the uplink transmission of the UE.

The downlink reception needs to satisfy that a bandwidth of the downlink reception falls within a LBT bandwidth or a LBT sub-band (also called a LBT channel or a LBT sub-channel) where the detected PDCCH is located. Or the bandwidth of the downlink reception falls within a LBT bandwidth or a LBT sub-band where a CORESET to which the detected PDCCH belongs is located.

Wherein, the detected PDCCH refers to passing a CRC of the PDCCH. The PDCCH may be scrambled by a C-RNTI, and in this case, the PDCCH is a scheduling PDCCH used by the base station to perform unicast services to the UE in the connected state. The PDCCH may also be scrambled by an SI-RNTI, a P-RNTI, an RA-RNTI or a TC-RNTI, in this case, the PDCCH is a scheduling PDCCH used by the base station to perform broadcast services to the UE, the broadcast services may include SIB1, SIBx, paging and Random Access Response (RAR), etc., wherein the SIBx refers to some SIBs other than the SIB1.

In the existing technology, it is usually assumed that in the unlicensed spectrum, for a given PO, a paging PDCCH has additional paging PDCCH monitoring occasions, so original S numbers of monitoring occasions are extended to S·X numbers of paging PDCCH monitoring occasions, wherein S is specified by a protocol, S is an integer, and X is an integer. According to the embodiment, when the UE monitors the paging PDCCH, the UE may monitor only S numbers of paging PDCCH monitoring occasions. Wherein, S represents a number of actually transmitted SSBs indicated by a base station, or S represents a number of SSBs in a subset of an actually transmitted SSB set indicated by the base station. The subset is a set formed of SSBs which are non-Quasi Co-Located (non-QCLed). That is, the UE may assume that the paging PDCCH has no additional PDCCH sensing occasion, or the UE may assume that the paging PDCCH has no shift or cyclic shift. It should be noted that the paging PDCCH refers to a PDCCH scrambled by a P-RNTI with a CRC.

When the UE monitors an OSI PDCCH, the UE may monitor only S numbers of PDCCH monitoring occasions. Wherein, S represents a number of actually transmitted SSBs indicated by a base station, or S represents a number of SSBs in a subset of an actually transmitted SSB set indicated by the base station. The subset is a set formed of SSBs which are non-Quasi Co-Located (non-QCLed). It should be noted that the OSI PDCCH refers to a PDCCH scrambled by an SI-RNTI with a CRC.

Further, there is a time gap, or a time offset exists between a starting time of the uplink transmission or a starting time of the downlink reception and a starting time of the FFP. Or there is a time gap or a time offset exists between a starting time of the uplink transmission or a starting time of the downlink reception and a nearest GC-PDCCH which the UE can monitor. The time gap or the time offset is predefined, or the time gap or the time offset is configured by the base station.

Embodiment two: if a PDCCH is detected in a FFP, a UE may determine that an uplink transmission or a downlink reception can be performed in the FFP. In general, the SSB or the PBCH is transmitted periodically, and a UE knows information such as the period of the SSB or the PBCH. Therefore, even if a GC-PDCCH is not detected or the GC-PDCCH is not configured, the UE can still obtain information about a channel occupied by the base station in the current FFP through the detected SSB or the PBCH.

That the uplink transmission may be performed may refer to that the UE uses a channel with a high priority to conduct a channel sensing, a channel assessment or a LBT. That the uplink transmission may be performed may also refer to that the UE uses a channel with a highest priority to conduct a channel sensing, a channel assessment or a LBT, which is beneficial for improving the successful probability of the uplink transmission.

That the uplink transmission may be performed may refer to that the UE selects a smaller sensing channel duration for a channel sensing or a channel assessment or a LBT. For example, the sensing channel duration may be 16 µs, 25 µs, etc. That the sensing channel duration may also be referred to as a Short Inter-Frame Space (SIFS). That the uplink transmission may be performed may also refer to that the UE does not perform a channel sensing or a channel assessment or a LBT, which is beneficial for improving the successful probability of the uplink transmission of the UE.

The downlink reception needs to satisfy that a bandwidth of the downlink reception falls within a LBT bandwidth (also called a channel) where the detected SSB or the PBCH is located. Or the bandwidth of the downlink reception falls within a LBT bandwidth where a BWP to which the detected SSB or the PBCH belongs is located.

Wherein, that the SSB is detected may refer to that the UE determines that the SSB is transmitted by the base station. The PBCH is detected may refer to passing the CRC of the PBCH.

In the existing technology, it is usually assumed that in the unlicensed spectrum, there are many candidate SSB positions, and an actually transmitted SSB is transmitted by the base station at the candidate SSB position during a CO period after obtaining the CO, that is, a shift or a cyclic shift. According to the embodiment, when the UE detects the SSB or the PBCH, the UE may monitor only S numbers of SSBs or PBCHs in the S numbers of SSB. Wherein, S represents a number of actually transmitted SSBs indicated by a base station, or S represents a number of SSBs in a subset of an actually transmitted SSB set indicated by the base station. The subset is a set formed of SSBs which are non-Quasi Co-Located (non-QCLed). That is, when the UE detects the SSB or the PBCH, the UE may assume that the shift or the cyclic shift of the SSB or the PBCH is not performed.

Further, the UE may determine an SSB where the detected PBCH is located as a measurement sample for a RRM measurement and/or a RLM measurement. The UE may determine the SSB where the detected PBCH is located as a In-Sync sample for the RLM measurement.

Further, there may be a time gap, or a time offset exists between a starting time of the uplink transmission and a starting time of the FFP. There may be a time gap, or a time offset exists between a starting time of the downlink reception and a starting time of the FFP. Or there may be a time gap or a time offset exists between a starting time of the uplink transmission and a nearest GC-PDCCH which the UE can monitor. There may be a time gap, or a time offset exists between a starting time of the downlink reception and a nearest GC-PDCCH which the UE can monitor. The time gap or the time offset is predefined, or the time gap or the time offset is configured by the base station.

In some embodiment, when the UE is in an idle state (IDLE) or in an inactive state (INACTIVE), assuming that the base station cannot configure the idle state GC-PDCCH to the UE. In this case, if the UE in the idle state or in the inactive state does not detect the GC-PDCCH or the base station does not configure the GC-PDCCH, when the UE detects other downlink signals other than the GC-PDCCH, subsequent processing can be performed according to following embodiments (Embodiment three or Embodiment four).

Embodiment three: if a PDCCH is detected in a FFP, a UE may determine that an uplink transmission or a downlink reception can be performed in the FFP. Embodiment one can be referred to for details.

Since the UE is in the idle state or in the inactive state, the PDCCH may be scrambled by an SI-RNTI, a P-RNTI, an RA-RNTI or a TC-RNTI, the PDCCH is a scheduling PDCCH used by the base station to perform broadcast services to the UE. Wherein, the broadcast services may include SIB1, SIBx, paging and RAR, etc. In addition, the PDCCH may also be a PDCCH carrying a Paging Indicator. Generally, a Paging Indicator triggers a group or one UE to monitor the paging PDCCH on the current or a subsequent PO. The Paging Indicator PDCCH is an optimized way of paging, which may further group UEs monitoring a same PO, thereby reducing the probability of false alert.

Embodiment four: if a SSB or a PBCH is detected in a FFP, a UE may determine that an uplink transmission or a downlink reception can be performed in the FFP. Embodiment two can be referred to for details.

In some embodiment, when the UE is in the idle state or in the inactive state, assuming that the base station can configure the idle state GC-PDCCH to the UE. In this case, the UE may perform subsequent processing through the following embodiments (Embodiment five).

Embodiment five: if the idle state GC-PDCCH is detected in a FFP, a UE may determine that an uplink transmission or a downlink reception can be performed in the FFP. In some embodiment, the UE may obtain configuration information of the idle state GC-PDCCH through SIB1 information. The CORESET associated with the idle state GC-PDCCH may be a CORESET0 by default. The idle state GC-PDCCH may carry a Paging Indicator. Wherein, a Paging Indicator triggers a group or one UE to monitor a paging PDCCH on the current or a subsequent PO or a PDCCH scrambled by P-RNTI with CRC. In some embodiment, when a FFP corresponding to the idle state GC-PDCCH includes a PO or a paging PDCCH monitoring occasion or signals/channels related to a process of transmitting/receiving an RACH (including signals/channels related to Msg-1, Msg-2, Msg-3, Msg-4). In general, a channel associated with the Msg-1 may be a PRACH. A channel associated with the Msg-2 may be a Random Access Response PDCCH and/or an RAR PDSCH. A channel associated with the Msg-3 may be a PUSCH and/or a PUCCH. A channel associated with the Msg-4 may be a PDCCH and/or PDSCH.

In summary, when the UE fails to detect the GC-PDCCH in the FFP or the base station does not configure the GC-PDCCH for the UE, if the UE receives other downlink signals in the FFP, the embodiment of the present disclosure allows the UE to determine that whether an uplink transmission or a downlink reception can be performed, which provides a feasible technical solution for the UE to perform subsequent data transmission and reception. In addition, when the UE is in the idle state or the inactive state, if the UE receives the idle state GC-PDCCH in the FFP, the UE can still determine whether the uplink transmission or the downlink reception can be performed, which provides the possibility for the UE to obtain the LBT bandwidth with a higher probability.

Figure 2:
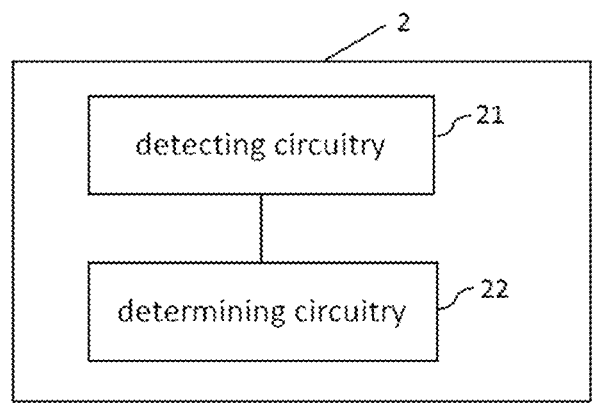
FIG. 2 schematically illustrates a structural diagram of an apparatus for receiving data according to an embodiment of the present disclosure.

FIG. 2 schematically illustrates a structural diagram of an apparatus for receiving data according to an embodiment of the present disclosure. The apparatus described in the embodiment may be used to implement the above methods described in the embodiments as shown in FIG. 1, which is executed by the UE. Specifically, the apparatus 2 for receiving data includes: a detecting circuitry 21, adapted to detect a downlink signal in a FFP; a determining circuitry 22, adapted to determine that an uplink transmission or a downlink reception can be performed in the FFP in response to the downlink signal being successfully detected in the FFP.

For more details about the working principles and working modes of the apparatus for mapping a sequence of a common reference signal, reference may be made to the relevant descriptions in FIG. 1 to FIG. 6, which will not be repeated here.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

The above embodiments may be implemented in whole or in part by software, hardware, firmware or any combination thereof. When implemented in software, the above embodiments may be implemented in whole or in part in the form of a computer program product. The computer program product includes one or more computer instructions or computer programs. The procedures or functions according to the embodiments of the present disclosure are wholly or partially generated when the computer instructions or the computer programs are loaded or executed on a computer. The computer may be a general purpose computer, a special purpose computer, a computer network, or other programmable device. The computer instructions may be stored in a computer readable storage medium or transmitted from one computer readable storage medium to another computer readable storage medium, for example, the computer instructions may be transmitted from one website, computer, server or data center to another website, computer, server or data center by wire (e.g., infrared, wireless, microwave and etc.). The computer readable storage medium may be any available medium that can be accessed by a computer or a data storage device such as a server or a data center that contains one or more sets of available media. The available medium may be a magnetic medium (e.g., floppy disk, hard disk or magnetic tape), an optical medium (e.g., DVD), or a semiconductor medium. The semiconductor medium may be a solid disk.

It should be understood that, in the various embodiments of the present disclosure, sequence numbers of the above-mentioned processes do not represent an execution sequence, and the execution sequence of each process should be determined by its function and inherent logic, which does not limit an implementation process of the embodiments of the present disclosure.

In the above embodiments of the present disclosure, it should be understood that the disclosed method, device and system may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

The integrated units implemented in the form of the software functional unit may be stored in a computer readable storage medium. The software functional unit is stored in a storage medium and includes several instructions for causing a computer device (a personal computer, a server or a network device) to execute some steps of the methods in the embodiments of the present disclosure. And the storage medium may be a medium for storing program codes, such as a U disk, a removable hard disk, a ROM, a RAM, a magnetic disk or an optical disk.

In an embodiment of the present disclosure, a storage medium having computer instructions stored therein is provided, wherein when the computer instructions are executed, any one of the above methods as shown in FIG. 1 is performed. In some embodiment, the storage medium may be a computer readable storage medium and may include a non-volatile or a non-transitory memory, or include a ROM, a RAM, a magnetic disk or an optical disk.

In an embodiment of the present disclosure, a terminal including a memory and a processor is provided, wherein the memory has computer instructions stored therein, and when the processor executes the computer instructions, any one of the above methods as shown in FIG. 1 is performed. The terminal may be a NR UE.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for receiving data, comprising:
   detecting a downlink signal in a Fixed Frame Period (FFP); and
   determining that an uplink transmission or a downlink reception can be performed in the FFP in response to the downlink signal being detected in the FFP;
   wherein said determining that the uplink transmission or the downlink reception can be performed in the FFP in response to the downlink signal being detected in the FFP comprises:
   determining that the uplink transmission or the downlink reception can be performed in the FFP in response to a paging indicator being detected in the FFP.

2. The method according to claim 1, wherein said determining that an uplink transmission can be performed in the FFP refers to using a channel with a high priority to conduct a channel sensing, a channel assessment or a Listen-Before-Talk (LBT).

3. The method according to claim 1, wherein said determining that an uplink transmission can be performed in the FFP refers to performing the uplink transmission when a channel is sensed to be idle in a first duration, or performing the uplink transmission without sensing the channel.

4. The method according to claim 1, wherein the downlink signal comprises a PDCCH, a bandwidth of the downlink reception is located in a LBT bandwidth or a LBT sub-band where the PDCCH is located; or the bandwidth of the downlink reception is located in a LBT bandwidth or a LBT sub-band of a Control Resource Set (CORESET) to which the PDCCH belongs.

5. The method according to claim 1, wherein the downlink signal comprises a PDCCH, and a scrambling of the PDCCH comprises at least one selected from a group consisting of: a C-RNTI, a SI-RNTI, a P-RNTI, a RA-RNTI, and a TC-RNTI.

6. The method according to claim 1, wherein the downlink signal comprises a PDCCH, and the PDCCH comprises a PDCCH carrying a Paging Indicator the paging indicator.

7. The method according to claim 1, wherein the downlink signal comprises a paging PDCCH or an Other System Information (OSI) PDCCH, and a number of paging PDCCH monitoring occasions or a number of OSI PDCCH monitoring occasions is S;
wherein, S represents a number of actually transmitted SSBs indicated by a base station, or, S represents a number of SSBs in a subset of an actually transmitted SSB set indicated by the base station, and S is an integer.

8. The method according to claim 7, wherein the subset of the actually transmitted SSB set is a set formed of SSBs which are non-Quasi Co-Located (non-QCLed).

9. The method according to claim 1, wherein there is a time gap exists between a starting time of the uplink transmission and a starting time of the FFP; or a time gap exists between a starting time of the downlink reception and the starting time of the FFP.

10. The method according to claim 1, wherein there is a time gap exists between a starting time of the uplink transmission and a first Group Common PDCCH (GC-PDCCH); or a time gap exists between a starting time of the downlink reception and the first GC-PDCCH; wherein, the first GC-PDCCH refers to a GC-PDCCH closest to the starting time.

11. The method according to claim 1, wherein the downlink signal comprises an SSB, wherein a bandwidth of the downlink reception is located in a LBT bandwidth or a LBT sub-band where the SSB is located; or the bandwidth of the downlink reception is located in a LBT bandwidth or a LBT sub-band of a Bandwidth Part (BWP) to which the SSB belongs.

12. The method according to claim 11, wherein said downlink signal being detected refers to that a User Equipment (UE) determines that the SSB is transmitted by a base station.

13. The method according to claim 1, wherein the downlink signal comprises a PBCH, wherein a bandwidth of the downlink reception is located in a LBT bandwidth or a LBT sub-band where the PBCH is located; or the bandwidth of the downlink reception is located in a LBT bandwidth or a LBT sub-band of a BWP to which the PBCH belongs.

14. The method according to claim 13, wherein said downlink signal being detected refers to passing a CRC of the PBCH.

15. The method according to claim 1, wherein the downlink signal comprises a SSB or a PBCH, and a number of monitoring occasions of the SSB or the PBCH is S;
wherein, S represents a number of actually transmitted SSBs indicated by a base station, or, S represents a number of SSBs in a subset of an actually transmitted SSB set indicated by the base station, and S is an integer.

16. The method according to claim 15, wherein the subset of the actually transmitted SSB set is a set formed of SSBs which are non-Quasi Co-Located (non-QCLed).

17. The method according to claim 1, wherein said determining that an uplink transmission or a downlink reception can be performed in the FFP in response to the downlink signal being detected in the FFP comprises:
determining that the uplink transmission or the downlink reception can be performed in the FFP, in response to the GC-PDCCH being not detected in the FFP but some downlink signals other than the GC-PDCCH being detected.

18. The method according to claim 1, wherein said determining that an uplink transmission or a downlink reception can be performed in the FFP in response to the downlink signal being successfully detected in the FFP comprises:
determining that the uplink transmission or the downlink reception can be performed in the FFP in response to the GC-PDCCH being detected in the FFP.

19. An apparatus for receiving data, comprising:
a detecting circuitry, adapted to detect a downlink signal in a Fixed frame period (FFP); and
a determining circuitry, adapted to determine that an uplink transmission or a downlink reception can be performed in the FFP in response to the downlink signal being successfully detected in the FFP;
wherein said determining that the uplink transmission or the downlink reception can be performed in the FFP in response to the downlink signal being detected in the FFP comprises:
determining that the uplink transmission or the downlink reception can be performed in the FFP in response to a paging indicator being detected in the FFP.

20. A non-transitory storage medium storing one or more programs, the one or more programs comprising computer instructions, which, when executed by a processor, cause the processor to:
detect a downlink signal in a Fixed Frame Period (FFP); and
determine that an uplink transmission or a downlink reception can be performed in the FFP in response to the downlink signal being detected in the FFP;
wherein said determining that the uplink transmission or the downlink reception can be performed in the FFP in response to the downlink signal being detected in the FFP comprises:
determining that the uplink transmission or the downlink reception can be performed in the FFP in response to a paging indicator being detected in the FFP.

* * * * *

UNITED STATES PATENT AND TRADEMARK OFFICE
CERTIFICATE OF CORRECTION

| | |
|---|---|
| PATENT NO. | : 12,262,413 B2 |
| APPLICATION NO. | : 17/775455 |
| DATED | : March 25, 2025 |
| INVENTOR(S) | : Huayu Zhou, Xingya Shen and Zhengang Pan |

Page 1 of 1

It is certified that error appears in the above-identified patent and that said Letters Patent is hereby corrected as shown below:

In the Claims

Column 15, Line 15-17 Claim 6 should read:
The method according to claim 1, wherein the downlink signal comprises a PDCCH, and the PDCCH comprises a PDCCH carrying the paging indicator.

Signed and Sealed this
Tenth Day of June, 2025

Coke Morgan Stewart
*Acting Director of the United States Patent and Trademark Office*